United States Patent Office 3,012,890
Patented Dec. 12, 1961

3,012,890
SYNTHETIC COCOA BUTTER SUBSTITUTE
Herbert J. Dutton and Charles R. Scholfield, Peoria, Ill., assignors to the United States of America as represented by the Secretary of Agriculture
No Drawing. Filed Feb. 3, 1960, Ser. No. 6,572
1 Claim. (Cl. 99—118)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a novel method of producing synthetic cocoa butter and closely related oleaginous substitutes from inexpensive raw materials.

Cocoa butter is a fat having unusual physical properties. It melts completely at 33°–34° C. or slightly below body temperature, and is a hard brittle solid at normal room temperatures. Because of transitions of polymorphic crystalline forms it displays two melting points after rapid chilling. The first form melts at 25° C., then resolidifies as the temperature slowly rises and melts once more at 33°–34° C. corresponding to the second polymorphic form. Cocoa butter is used in confectionery products largely because its physical properties contribute glossy coatings, absence of stickiness, and favorable volume changes in the molding operation for the enrobed confection. Procedures for slightly raising the melting point of cocoa butter to prevent bloom at summer temperatures are known in the art. Cocoa butter is also widely used, though in small volume, as a suppository vehicle.

That the unique melting characteristics of cocoa butter are a consequence of the arrangement of the fatty acids in its glycerides is illustrated by a comparison of cocoa butter with mutton tallow which is similar to it in fatty acid composition but unsuitably different in physical properties. Because of demand for the properties which cocoa butter imparts, large quantities of this dollar-per-pound commodity are imported even when domestic fats at less than one-fifth the cost are in plentiful supply.

The triglyceride composition and structure of cocoa butter have previously been investigated using fractional crystallization techniques and the results have been interpreted to suggest that the structure represents an "even" distribution of oleic, palmitic, and stearic acid triglycerides. By use of countercurrent distribution and application of more than 1,000 extraction stages, we have discovered that a specific "modified random" rather than an "even" pattern characterizes cocoa butter and is responsible for its characteristic melting points and other specific properties.

Employing a solvent system consisting of 3.8 liters of furfural and 3.8 liters of nitroethane equilibrated with 10 liters of pentane-hexane in a 200-tube Craig countercurrent apparatus, carried to 1150 transfers by recycling, we have discovered the specific disposition of the glycerides of cocoa butter. Palmito-oleo-stearin is present to the extent of 41 percent and is the main triglyceride. We found tristearin to comprise only 0.16 percent of the total cocoa butter glycerides. We have further discovered that the palmitic and stearic acid moieties are randomly distributed on the 1 and 3 positions of the glycerides.

Thus, we have found that except for a small percentage of trisaturates and linoleic acid-containing glycerides, oleic acid occurs at least once in each glyceride molecule. Cocoa butter comprises principally monoolefins, namely oleodistearin, 22 percent; oleopalmitostearin, 41 percent; and oleodipalmitin, 12 percent. Since the latter glyceride is not permitted under a pure "even" distribution pattern and the low trisaturates content is inconsistent with a random distribution pattern of fatty acids, it is clear that cocoa butter follows neither a strict random nor a strict "even" pattern of glyceride structure. In agreement with recent enzymatic studies of others indicating that oleic acid occurs predominately in the 2 position of glycerol molecules, our results show cocoa butter to be predominately composed of glyceride molecules containing at least one oleic acid unit per molecule. Further, our countercurrent distribution fractionation results are consistent with a random distribution of palmitic and stearic acids on the 1 and 3 positions of glycerol.

Numerous variants exist in the conduct of our cocoa butter synthesis. By varying the ratios of palmitic and stearic acid in the triglycerides used for directed interesterification, diglyceride and subsequently triglyceride mixtures of varying composition are obtained with modified melting point and other physical properties.

In commercial practice, natural fats containing palmitic, stearic and $C_{18}$ unsaturated fats would be used as starting points for diglyceride synthesis. For example, hydrogenation of lard would yield a 3–4:1 proportion of stearin to palmitin. By single solvent crystallization or other known crystallization procedures the palmitic acid content of lard may be raised to 50 percent. In a similar manner other fats such as palm oils might be directly hydrogenated or fractionated to increase palmitic acid and subsequently hydrogenated. For example, soybean oil hydrogenated without crystallization would give a 9:1 stearic to palmitic ratio and the synthetic cocoa butter product would have a higher melting point than the natural cocoa butter, which is desirable for use in enrobing candy in warm climates.

Direct isolation of saturated diglycerides from a natural fat in a single step process may also be achieved in commercial practice. Appropriate glycerol and interesterification catalyst have been added to lard and the temperature lowered from 120° F. as described by Baur and Lange (J.A.C.S. 73: 3926 (1951)) under conditions of directed interesterification to yield crystalline diglycerides directly. Completion of the esterification to triglycerides by oleyl chloride can then be carried out as described in the examples. Since lard and cocoa butter have comparable fatty acid compositions the problem of converting this 10 cents per pound product to a $1.00 per pound product is simply a problem of the rearrangement of position of fatty acids on the glycerol molecule. Under this concept direct formation of the 1,3-palmito stearo diglyceride from lard by directed interesterification and recovery of the olein would be the first step. Conversion of the olein with oleyl chloride and resynthesis of the triglyceride would be a second step. Alkali refining and deodorization would complete the process for rearranging lard into cocoa butter.

Based upon the above findings and interpretations we synthesized a cocoa butter substitute, as set forth in Example 1 below, employing the Baur and Lange procedure for pure monoacid diglycerides but employing an equal quantity of tripalmitin and tristearin instead of using a single pure triglyceride. A random mixture of dipalmityl, distearyl, and palmityl stearyl 1,3-diglycerides was thus synthesized. The synthesis of the cocoa butter substitute was completed by acylation of the 2-hydroxyl with oleyl chloride.

EXAMPLE 1

Tripalmitin (4.42 gm.), tristearin (4.88 gm.), and triacetin (6.75 gm.) were melted and held with stirring for 2 hours at 60° C. under an inert gas after adding 4 ml. of sodium methoxide catalyst (0.0208 gm./ml.) (Eckey, U.S. Pat. 2,442,531). To the homogeneous reaction mixture was then added 1.74 ml. of dry glycerol and heating was continued for 24 hours. Then in steps at 2-day intervals, the temperature was lowered to 46°, 38°, 32°, and 27° C. After the addition of 2 drops of glacial acetic acid, the mixed 1,3-diglycerides were crystallized from heptane-ethanol (1:1) and dried, providing the selective recovery of stearic and palmitic acid-containing diglycerides. Acylation of the 2-hydroxyl groups was carried out by reacting 2.2 gm. oleyl chloride with 3.5 gms. of the 1,3-mixed glycerides at a pressure of 2 mm. and temperature of 100° C. The synthetic cocoa butter melted at 31°–32° C., had an iodine value of 33.9, and a fatty acid composition of 18.2 percent palmitic, 40.8 percent stearic, and 41.0 percent oleic acids. When mixed with natural cocoa butter in 25 and 50 percent proportions, dual melting points were found at 24.5° C. and 32–33° C.

EXAMPLE 2

*Preparation of synthetic cocoa-butter*

Twenty and three-tenths grams of tripalmitin and 20.3 grams of tristearin were mixed with 22.2 g. of triacetin and 16 ml. of NaOMe (0.0208 g./ml.). This mixture was allowed to melt at 110° C. and maintained with constant stirring for two hours, at which time 6 ml. of dry glycerol was added. Heating at 60° C. was continued for one day. The temperature was then lowered to 47° C. and maintained for two days. It was then slowly lowered over the period of one day to 32° C. and then slowly during another 24 hours to room temperature. Crystals began to form at about 37° C. The mixture was taken up in 200 ml. of 1:1 n-heptane, 95 percent ethanol and 2 ml. of glacial acetic acid and allowed to crystallize from the solvent first at room temperature and then at 2° C. for an hour. The crystals were collected on a Buchner funnel. The filtrate was concentrated by evaporation and more crystals formed at 2° C.

The two fractions of diglyceride crystals were analyzed and then combined. Total yield of diglyceride was 37.86 grams or 93.25 percent of original. Composition: 45.69 percent palmitate and 54.31 percent stearate.

Thirty-four and six-tenths grams of the 1-3 randomly distributed diglycerides were reacted with 22.0 grams of oleyl chloride at 1.2 mm. of pressure and at 100–150° C. for two hours. The resulting sample was dissolved in ether, decolorized using carbon black, filtered on a Buchner funnel, and the solvent evaporated. Yield 47.2 gms., iodine value 31.8, palmitic acid 29.5 percent, stearic acid 37.3 percent, oleic acid 36.0 percent, melting point 34°–37° C. A portion of this preparation was refined with soda ash and steam deodorized to give a bland product as determined by a taste panel.

Having thus fully disclosed our invention, we claim:

A method of preparing a synthetic cocoa butter substitute comprising reacting substantially equal quantities of tripalmitin and tristearin with glycerol in the presence of triacetin and sodium methoxide catalyst, separating and crystallizing the random mixture of 1,3-diglycerides formed, and acylating the 2-hydroxyl groups thereof with oleyl chloride.

References Cited in the file of this patent

UNITED STATES PATENTS 2,442,531     Eckey ------------------ June 1, 1948

OTHER REFERENCES

"Cocoa Butter-Like Fats From Domestic Oils" by Feuge et al., The Journal of the American Oil Chemists Society, May 1958, vol. XXXV, No. 5, pp. 194–199.

"An Outline of Organic Chemistry," Revised, by Degeringet et al., Barnes and Noble, Inc., New York, p. 84.

Lutton: J. Am. Oil Chemists Soc., vol. 4, 1957, pp. 521–522.

Chapman et al.: J. Chem. Soc., 1957, pp. 1502–1509.